(12) United States Patent
Kleinberger (10) Patent No.: US 9,575,633 B2
(45) Date of Patent: Feb. 21, 2017

(54) USER INTERFACE UTILITY ACROSS SERVICE PROVIDERS

(71) Applicant: Ilan Kleinberger, Jerusalem (IL)

(72) Inventor: Ilan Kleinberger, Jerusalem (IL)

(73) Assignee: CA, Inc., New York, NY (US)

( * ) Notice: Subject to any disclaimer, the term of this patent is extended or adjusted under 35 U.S.C. 154(b) by 339 days.

(21) Appl. No.: 13/705,047

(22) Filed: Dec. 4, 2012

(65) Prior Publication Data

US 2014/0157134 A1 Jun. 5, 2014

(51) Int. Cl.
| | |
|---|---|
| *G06F 3/0481* | (2013.01) |
| *G06F 3/0482* | (2013.01) |
| *G06F 3/0489* | (2013.01) |
| *G06Q 10/06* | (2012.01) |
| *G06Q 10/10* | (2012.01) |
| *H04L 12/58* | (2006.01) |
| *G06F 3/0484* | (2013.01) |
| *G06F 9/44* | (2006.01) |

(52) U.S. Cl.
CPC .......... *G06F 3/0484* (2013.01); *G06F 3/0481* (2013.01); *G06F 9/4443* (2013.01); *G06F 3/0482* (2013.01); *G06F 3/04817* (2013.01); *G06F 3/04895* (2013.01); *G06Q 10/06* (2013.01); *G06Q 10/10* (2013.01); *H04L 12/58* (2013.01)

(58) Field of Classification Search
CPC ......... G06Q 10/06; G06Q 10/10; H04L 12/58; G06F 3/04817; G06F 3/0482; G06F 3/04895

USPC . 715/752, 273, 738, 739, 753, 758; 709/206
See application file for complete search history.

(56) References Cited

U.S. PATENT DOCUMENTS

| | | | | |
|---|---|---|---|---|
| 5,596,702 | A * | 1/1997 | Stucka | G06F 8/38 715/746 |
| 5,745,115 | A * | 4/1998 | Purple | G06F 9/4443 715/781 |
| 6,229,539 | B1 * | 5/2001 | Morcos et al. | 715/808 |
| 6,385,644 | B1 * | 5/2002 | Devine et al. | 709/206 |
| 6,438,215 | B1 * | 8/2002 | Skladman et al. | 379/67.1 |
| 6,496,203 | B1 * | 12/2002 | Beaumont | G06F 9/4443 715/744 |
| 6,671,818 | B1 * | 12/2003 | Mikurak | 714/4.21 |
| 6,839,735 | B2 * | 1/2005 | Wong et al. | 709/204 |
| 7,177,859 | B2 * | 2/2007 | Pather et al. | |
| 7,249,162 | B2 * | 7/2007 | Rounthwaite et al. | 709/206 |
| 7,493,373 | B2 * | 2/2009 | Takaluoma et al. | 709/217 |
| 7,562,304 | B2 * | 7/2009 | Dixon et al. | 715/738 |
| 7,620,894 | B1 * | 11/2009 | Kahn | G06F 3/0481 715/707 |

(Continued)

*Primary Examiner* — Eric J Bycer
(74) *Attorney, Agent, or Firm* — Baker Botts L.L.P.

(57) ABSTRACT

Providing a user interface utility across service providers includes determining an active service associated with a particular service provider from a plurality of predetermined related services associated with respective service providers stored in a memory. A utility corresponding to the plurality of predetermined related services is formatted for display on a display device, and a function selected in the utility for the active service associated with the particular service provider is executed. The function is common to each of the plurality of predetermined related services. The same utility is displayed for each of the plurality of predetermined related services associated with respective service providers, which are different from each other.

17 Claims, 3 Drawing Sheets

(56) References Cited

U.S. PATENT DOCUMENTS

| | | | |
|---|---|---|---|
| 8,108,783 B2* | 1/2012 | Emam et al. | 715/762 |
| 8,413,059 B2* | 4/2013 | Lee et al. | 715/752 |
| 8,689,116 B2* | 4/2014 | Guzman et al. | 715/752 |
| 8,701,091 B1* | 4/2014 | Wloka | G06F 9/4443 717/125 |
| 2002/0059380 A1* | 5/2002 | Biliris et al. | 709/206 |
| 2002/0186249 A1* | 12/2002 | Lu et al. | 345/781 |
| 2004/0128359 A1* | 7/2004 | Horvitz et al. | 709/207 |
| 2004/0158610 A1* | 8/2004 | Davis et al. | 709/206 |
| 2004/0225718 A1* | 11/2004 | Heinzel et al. | 709/206 |
| 2005/0060643 A1* | 3/2005 | Glass et al. | 715/501.1 |
| 2005/0076110 A1* | 4/2005 | Mathew et al. | 709/223 |
| 2005/0222985 A1* | 10/2005 | Buchheit et al. | 707/3 |
| 2005/0262203 A1* | 11/2005 | Buchheit et al. | 709/206 |
| 2005/0262449 A1* | 11/2005 | Anderson | H04L 29/06027 715/779 |
| 2006/0236328 A1* | 10/2006 | DeWitt | G06F 9/4445 719/329 |
| 2007/0061722 A1* | 3/2007 | Kronlund | G06F 9/4446 715/705 |
| 2007/0157013 A1* | 7/2007 | Park | G06F 9/4406 713/1 |
| 2008/0052642 A1* | 2/2008 | Champion | G06F 3/0482 715/862 |
| 2008/0148150 A1* | 6/2008 | Mall | G06F 3/048 715/707 |
| 2009/0070335 A1* | 3/2009 | Cozianu | G06F 11/1482 |
| 2009/0094553 A1* | 4/2009 | Karstens | G06F 3/04817 715/810 |
| 2009/0293004 A1* | 11/2009 | Emam et al. | 715/762 |
| 2010/0192074 A1* | 7/2010 | Fung et al. | 715/763 |
| 2010/0229110 A1* | 9/2010 | Rockey | G06F 9/4446 715/760 |
| 2010/0325266 A1* | 12/2010 | Nishimura | H04L 67/16 709/224 |
| 2011/0119601 A1* | 5/2011 | Knothe | G06F 8/38 715/760 |
| 2011/0282948 A1* | 11/2011 | Vitaldevara et al. | 709/206 |
| 2012/0151368 A1* | 6/2012 | Tam | G06F 9/4443 715/738 |

* cited by examiner

USER INTERFACE UTILITY ACROSS SERVICE PROVIDERS

BACKGROUND

The present disclosure generally relates to user interfaces, and more particularly, to a user interface utility that is persistent across service providers.

When changing from one software service provider to another software service provider, in a particular service or application type (e.g., a SaaS service such as web mail or the like), the entire graphical user interface (GUI) changes, even though at least some of the basic functionality may often remain mostly the same. These changes make it difficult for users of the previous systems or services to adapt to the new interface. Thus, changing service providers in an organization may create significant costs for training, lost productivity, and helpdesk issues. Accordingly, there may be reluctance to change service providers, and agile service use is more difficult to implement.

BRIEF SUMMARY

According to one aspect of the disclosure, a method comprises formatting, for display on a display device, a utility corresponding to a plurality of predetermined related services associated with respective service providers, and receiving a selection of a function of the utility, wherein the function is common to each of the plurality of predetermined related services. The method further comprises determining an active service associated with a particular service provider from the plurality of predetermined related services stored in a memory and executing the function of the utility in the active service associated with the particular service provider.

According to another aspect of the disclosure, a system comprises a storage unit configured to store a plurality of predetermined related services associated with respective service providers, and a formatting unit configured to format for display on a display device a utility corresponding to the plurality of predetermined related services. The system further comprises a receiver configured to receive a selection of the function in the utility, wherein the function is common to each of the plurality of predetermined related services. Moreover, the system comprises a determination unit configured to determine an active service associated with a particular service provider from the plurality of predetermined related services associated with respective service providers, and a function execution unit configured to execute the function of the utility in the active service associated with the particular service provider.

According to a further aspect of the disclosure, a computer program product comprises a computer readable storage medium having computer readable program code embodied therewith, and the computer readable program code comprises computer readable program code configured to format for display a utility corresponding to the plurality of predetermined related services, and computer readable program code configured to determine a selection of a function in the utility, wherein the function is common to each of the plurality of predetermined related services. The computer readable program code further comprises computer readable program code configured to determine an active service associated with a particular service provider from the plurality of predetermined related services associated with respective service providers, and computer readable program code configured to execute the function of the utility in the active service associated with the particular service provider.

Objects, features, and advantages of aspects of the disclosure will be apparent to persons of ordinary skill in the art from the following description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl®, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to embodiments of the disclosure, a utility (e.g., a toolbar, a frame, a window, an application, an interface, or the like) may recognize the service that is currently active. Multiple service providers may provide the same or a similar service (e.g., email, word processing, spreadsheet, graphic design, photo editing, or the like), which may be referred to hereafter as related services. Each of the related services provided by the different service providers may have a different interface that provides similar functionality across the different service providers. In other words, the interface may appear or be displayed differently between the different service providers, but the services may provide the same functions. Nevertheless, the utility may provide a persistent user interface across different service providers for the same service. The user interface may display the functions that are most commonly used for the service. For example, the utility may display 20% of the user-interface options or functions, that are used 80% of the time for the service and are common among the various service providers. Thus, when changing from one service provider to another service provider for a particular service, the need for training, costs of training, lost productivity, and helpdesk issues may be significantly reduced.

According to embodiments of the disclosure, a system may be implemented, for example, as a separate application that displays a floating toolbar, an added frame in a web browser or active window, a separate window, or the like. The system may use a preconfigured template to supply a consistent GUI. The template may provide the system with the information and functionality required to implement or mimic the normal behavior of the standard GUI of supported services and service providers. The standard GUI may be the GUI of the service as it is provided by the service provider. The utility may not replace the standard GUI, but may supplement the standard GUI such that the functions most often used are persistently displayed regardless of the service provider currently being used. The functionality of the service may be implemented either from the standard GUI or from the utility or both, with each providing the same functional results.

Further, the utility may be used as a teaching tool for using a service with a new or different service provider. For example, the utility may highlight a specific function on request or upon receiving an input. Upon receipt of an input, for example, the utility may show or point to the location of a specific function or tool in the standard GUI, or may highlight the position of a specific function or tool in the standard GUI when the utility receives an input (e.g., a button is pressed, an icon is selected, a command is given, or the like).

Figure 1:
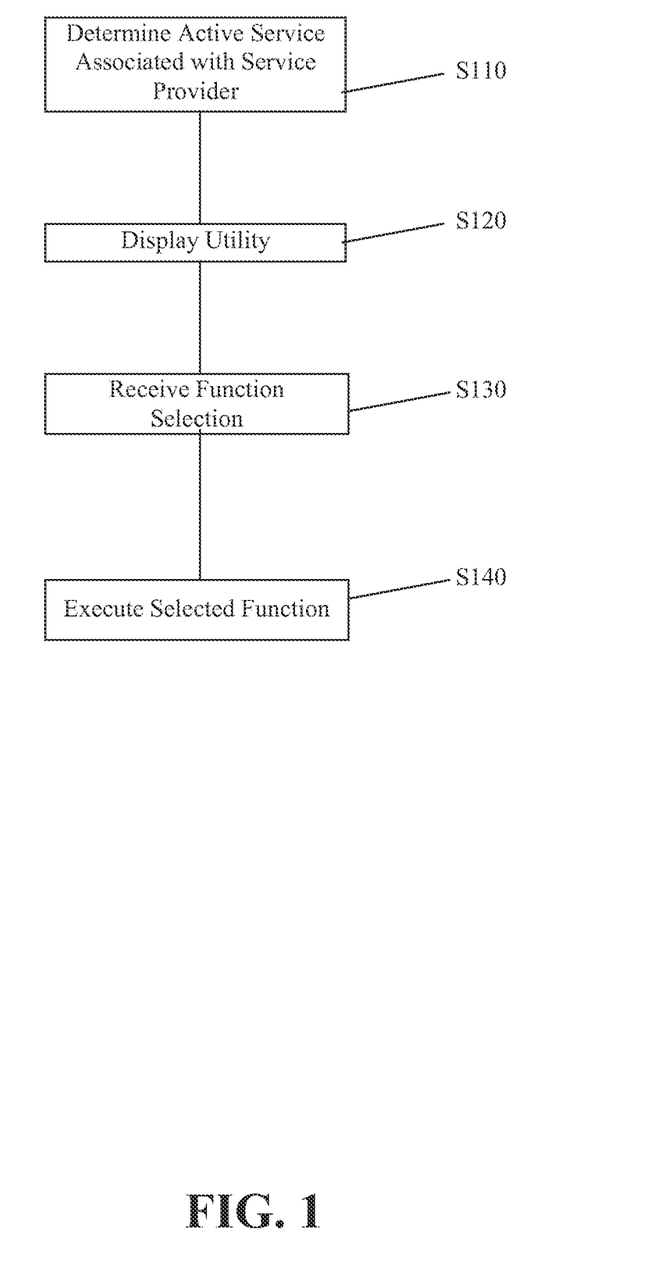
FIG. 1 illustrates a flowchart depicting a process, according to an embodiment.

Referring to FIG. 1, at S110, an active service associated with a particular service provider may be determined or recognized from a plurality of predetermined related services associated with respective service providers, which may be stored in a memory. The active service may be determined based on, for example, the currently active window, a most recently opened application or program, the service being displayed in the foreground of a display, the service within which an input was most recently received, the service in which a cursor or indicator is currently positioned, or the like. The related services may be provided by different service providers, but the services of the different service providers may be related based on, for example, the functions they perform, the tools they provide, the interface they display, or the like.

At S120, a utility corresponding to the plurality of predetermined related services may be displayed. The utility may be formatted for display on a display device. The utility may be, for example, a toolbar, a frame, a window, an icon, or the like, or any combination thereof. The utility may serve to display a function that is common to each of the plurality of predetermined related services. Further, the utility may serve to display a plurality of functions, and at least one of the plurality of functions may be common to each of the plurality of predetermined related services. Thus, there may be a function or plurality of functions that are common to the related services, which are respectively provided by different service providers. In other words, a particular function in a service provided by a first service provider may be the same or similar to a particular function in a same or related service provided by a second service provider.

A selection of the function in the utility to be executed for the active service may be received at S130. For example, an input may be received from an input device to select the function. Further, receiving a selection of a function may comprise receiving a voice command, sensing a touch, determining a location of an input device or an input device cursor on the display device, determining an input device gesture or movement, or the like, or any combination thereof. The function that is selected in the utility for the active service associated with the particular service provider may be executed at S140. Thus, a common function may be displayed in the utility that is applicable to multiple service providers, and the function may be executed at S140 upon selection of the function.

Figure 2:
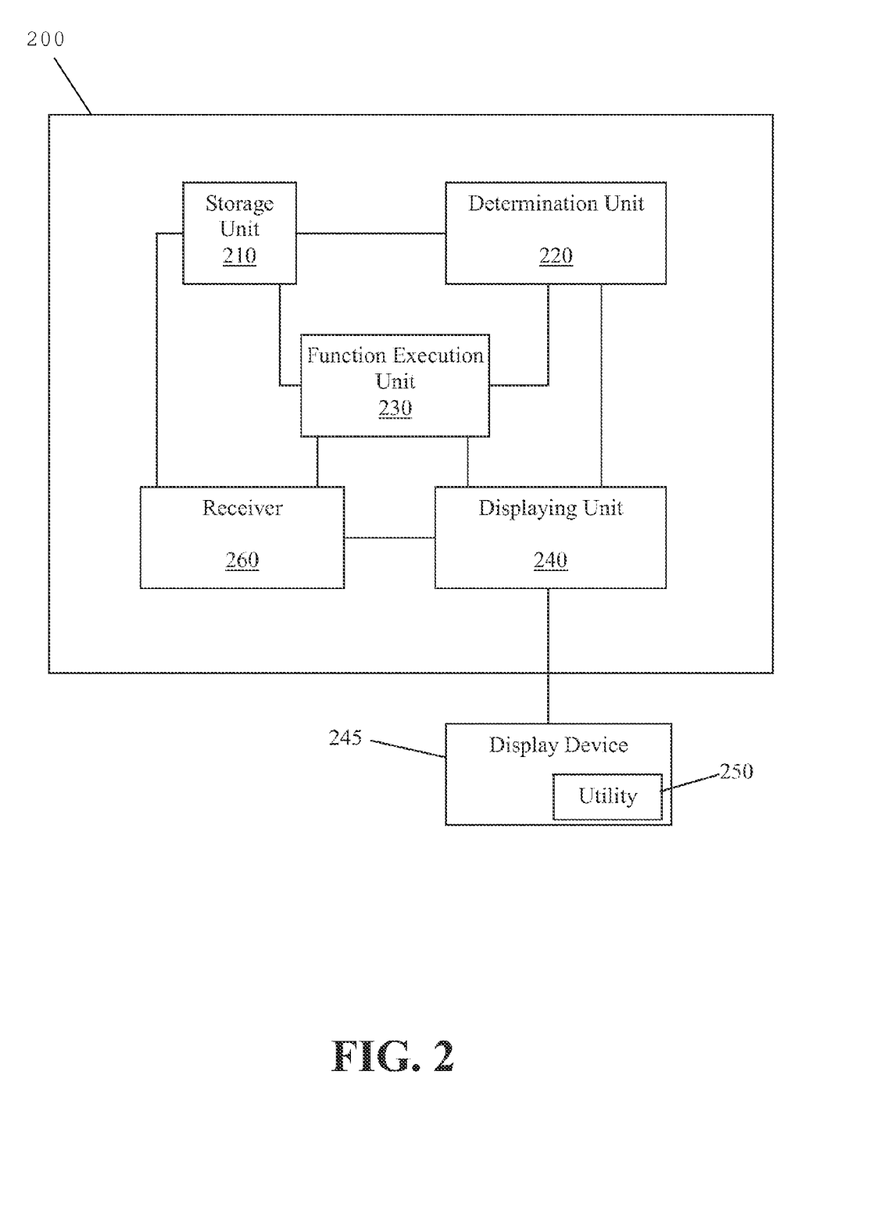
FIG. 2 illustrates a diagram depicting a system, according to an embodiment.

Referring to FIG. 2, a system 200 is depicted, according to an embodiment of the disclosure. System 200 may comprise a storage unit 210. Storage unit 210 may be configured to store a plurality of predetermined related services associated with respective service providers. Storage unit 210 may be any memory device or component capable of storing a set of data (e.g., a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing).

System 200 may further comprise a determination unit 220 configured to determine an active service associated with a particular service provider from the plurality of predetermined related services associated with respective service providers. Determination unit 220 may determine the active service based on, for example, the currently active window, a most recently opened application or program, the service being displayed in the foreground of a display, the service within which an input was most recently received, the service in which a cursor or indicator is currently positioned, or the like.

System 200 may comprise a displaying unit 240. Displaying unit 240 may be configured to format for display on a display device 245 a utility 250 corresponding to the plurality of predetermined related services. Display device 245 may be part of system 200 or may be separate or remote from system 200. Utility 250 may be, for example, a toolbar, a frame, a window, an icon, or the like, or any combination thereof. Utility 250 may serve to display a function or plurality of functions that is common to each of the plurality of predetermined related services respectively provided by different service providers. A function execution unit 230 may be configured to execute a function selected in utility 250 for the active service associated with the particular service provider. The function may be common to each of the plurality of predetermined related services provided by the different respective service providers.

System 200 may comprise a receiver 260 that may be configured to receive a selection of the function in utility 250 to be executed for the active service. For example, an input may be received by receiver 260 from an input device to select the function. The received input may comprise, for example, a voice command, sensing a touch, determining a location of an input device or an input device cursor on the display device, determining an input device gesture or movement, or the like, or any combination thereof.

Figure 3:
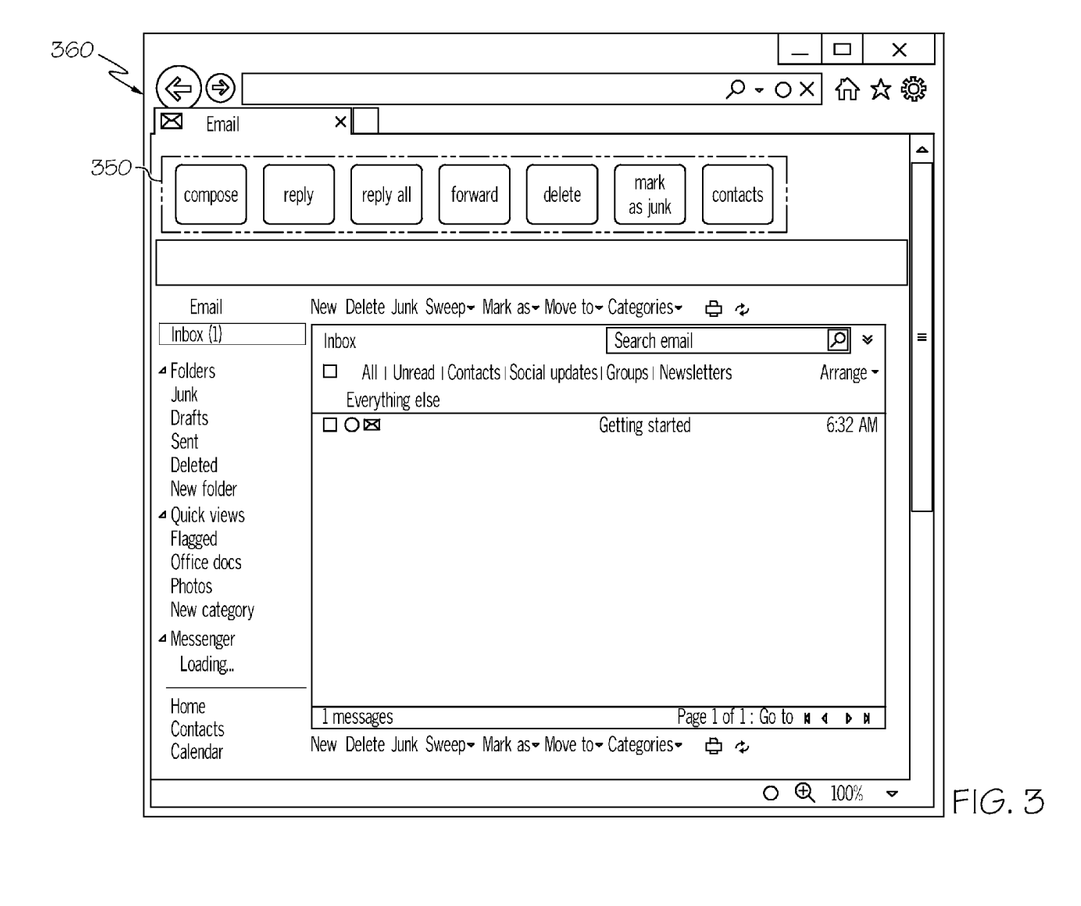
FIG. 3 illustrates an example graphical user interface with a utility, according to an embodiment.

Referring to FIG. 3, an example of a GUI for a service 360 is depicted. In the example, service 360 is for electronic mail (email) and may be provided by a particular service provider. The standard user interface for service 360 is depicted along with a utility 350 overlaying the standard user interface. In the example, utility 350 may be a toolbar, a frame, or a window within the window of service 360. Utility 350 may comprise, for example, buttons or icons that are displayed to represent various functions that may be executed in service 360. The buttons or icons displayed in utility 350 may be selected, such that a function is executed in service 360.

The functions in utility 350 may comprise the most commonly used functions for service 360 across different service providers that provide the same or similar service. For example, in FIG. 3, buttons or icons are displayed for "compose," "reply," "replay all," "forward," "delete," "mark as junk," and "contacts." The same utility 350 comprising those most commonly used functions is displayed for any email service provided by a number of different service providers. Thus, although the GUI for service 360 may appear different for a different service provider, utility 350 would be displayed in the same manner. Accordingly, although the "delete" function, for example, may be different or located in a different position within the GUI of different service providers, the "delete" button or icon in utility 350 is displayed and may be selected to execute the "delete" function in the email service of any of the different service providers.

As another example, a particular function may be named differently across different service providers. In FIG. 3, the email service depicted uses the term "New" for the function of composing a new email message. Another email service provided by a different service provider may use the term "Compose" for the same function of composing a new email message. Nevertheless, that function may be selected and executed in both email services provided by different service providers using the "compose" button or icon of utility 350. Thus, when changing email services from one service provider to another service provider, the same "compose" button or icon of utility 350 may be utilized, such that training, time to learn a new service provider, lost productivity, and the like may be greatly reduced or eliminated.

Further, utility 350 may be used as a teaching tool for using a service with a new or different service provider. For example, referring to FIG. 3, utility 350 may highlight a specific function based on a request or upon receiving an input. Upon receipt of an input (e.g., from an input device), for example, the utility may show or point to the location of a specific function or tool in the standard GUI, or may highlight the position of a specific function or tool in the standard GUI when the utility receives an input (e.g., a button is pressed, an icon is selected, a command is given, or the like). Thus, for example, if a cursor of an input device hovers over or selects the "mark as junk" button or icon in utility 350, the "Junk" function in the standard GUI of service 360 may be highlighted, circled, or the cursor may be automatically moved to point to its location. In this way, when the location, name, or other aspect of a particular function is unfamiliar in a service provided by a new or different service provider, utility 350 may assist in learning to use the functions of the new or different service provider.

By making the basic functionality of the related services provided by different service providers consistent, the complexity of changing to another service provider or introducing a new service provider may be reduced. According to embodiments of the present disclosure, using the utility, the user interface may remain the same for most of the important features or most commonly used functions of the particular service across service providers.

Accordingly, embodiments of the present disclosure allow for agile service use because the cost of changing from one service provider to another may be reduced, especially in larger organizations. The cost associated with changing service providers may be based primarily on differing GUIs across different service providers for basic functionality that may be the same or similar, or for functions that are common to the same or related services provided by different service providers. Thus, with the present disclosure, the need for training, costs of training, lost productivity, and helpdesk issues may be significantly reduced.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    determining an active service associated with a particular service provider from a plurality of predetermined related services associated with respective service providers, the active service comprising a standard user interface;
    formatting for display on a display device the standard user interface, and a utility interface corresponding to the plurality of predetermined related services associated with the respective service providers;
    receiving a selection of a function of the utility interface, wherein the function is common to each of the plurality of predetermined related services, wherein each function of the utility interface corresponds to a standard function on the standard user interface, and wherein the utility interface overlays the standard user interface such that each function of the utility interface and each standard function of the standard user interface are completely visible; and
    transmitting an instruction to execute the function of the utility interface in the active service associated with the particular service provider;
    wherein the utility interface comprises a plurality of functions, and
    wherein the plurality of functions include a function executed most frequently for the active service and a function executed most frequently for a first predetermined related service of the plurality of predetermined related services.

2. The method of claim 1, wherein the active service is a web-based active service.

3. The method of claim 1, wherein a function of the active service and function of a first predetermined related service correspond to the same functionality when executed but are represented by different symbols on the standard user interface and a user interface associated with the first predetermined related service, and
    wherein the method further comprises formatting for display on the utility interface the symbol associated with the function of the first predetermined related service.

4. The method of claim 1, further comprising:
    in response to receiving the selection of the function of the utility interface, formatting the standard user interface for display with an indication of the standard function that corresponds to the selected function of the utility interface.

5. The method of claim 4, wherein the indication of the standard function that corresponds to the selected function of the utility interface is selected from the group consisting of:
    pointing to the location of the standard function on the standard user interface;
    circling the location of the standard function on the standard user interface; and
    moving a cursor to the location of the standard function on the standard user interface.

6. The method of claim 1, wherein a function of the active service and function of a first predetermined related service correspond to the same functionality when executed but are represented by different symbols on the standard user interface and a user interface associated with the first predetermined related service, and wherein the method further comprises formatting for display on the utility interface the symbol associated with the function of the active service.

7. A system, comprising:
a storage unit configured to store a plurality of predetermined related services associated with respective service providers;
a determination unit configured to determine an active service associated with a particular service provider from a plurality of predetermined related services associated with respective service providers, the active service comprising a standard user interface;
a formatting unit configured to format for display on a display device the standard user interface, and a utility interface corresponding to the plurality of predetermined related services associated with the respective service providers;
a receiver configured to receive a selection of a function of the utility interface, wherein the function is common to each of the plurality of predetermined related services, wherein each function of the utility interface corresponded to a standard function on the standard user interface, and wherein the utility interface overlays the standard user interface;
in response to receiving the selection of the function of the utility interface, formatting the standard user interface for display with an indication of a position of the standard function that corresponds to the selected function of the utility interface; and
a function transmitting unit configured to transmit an instruction to execute the function of the utility interface in the active service associated with the particular service provider;
wherein the utility interface comprises a plurality of functions, and
wherein the plurality of functions include a function executed most frequently for the active service and a function executed most frequently for a first predetermined related service of the plurality of predetermined related services.

8. The system of claim 7, wherein the active service is a web-based active service.

9. The system of claim 7, wherein a function of the active service and function of a first predetermined related service correspond to the same functionality when executed but are represented by different symbols on the standard user interface and a user interface associated with the first predetermined related service, and
wherein the method further comprises formatting for display on the utility interface the symbol associated with the function of the first predetermined related service.

10. The system of claim 7, wherein a function of the active service and function of a first predetermined related service correspond to the same functionality when executed but are represented by different symbols on the standard user interface and a user interface associated with the first predetermined related service, and
wherein the method further comprises formatting for display on the utility interface the symbol associated with the function of the active service.

11. The system of claim 7, wherein the formatting unit is further configured to, in response to receiving the selection of the function of the utility interface, format the standard user interface for display with an indication of the standard function that corresponds to the selected function of the utility interface,
wherein the indication of the standard function that corresponds to the selected function of the utility interface is selected from the group consisting of:
pointing to the location of the standard function on the standard user interface;
circling the location of the standard function on the standard user interface; and
moving a cursor to the location of the standard function on the standard user interface.

12. A computer program product comprising:
a non-transitory computer readable storage medium having computer readable program code embodied therewith, the computer readable program code comprising:
computer readable program code configured to determine an active service associated with a particular service provider from a plurality of predetermined related services associated with respective service providers, the active service comprising a standard user interface;
computer readable program code configured to format for display on a display device the standard user interface, and a utility interface corresponding to the plurality of predetermined related services associated with the respective service providers;
computer readable program code configured to determine a selection of a function of the utility interface, wherein the function is common to each of the plurality of predetermined related services, wherein each function of the utility interface corresponds to a standard function on the standard user interface, and wherein the utility interface overlays the standard user interface such that each function of the utility interface and each standard function of the standard user interface are completely visible; and
computer readable program code configured to transmit an instruction to execute the function of the utility interface in the active service associated with the particular service provider;
wherein the utility interface comprises a plurality of functions, and
wherein the plurality of functions include a function executed most frequently for the active service and a function executed most frequently for a first predetermined related service of the plurality of predetermined related services.

13. The computer program product of claim 12, wherein the active service is a web-based active service.

14. The computer program product of claim 12, wherein a function of the active service and function of a first predetermined related service correspond to the same functionality when executed but are represented by different symbols on the standard user interface and a user interface associated with the first predetermined related service, and
wherein the computer readable program code is further configured to format for display on the utility interface the symbol associated with the function of the first predetermined related service.

15. The computer program product of claim 12, further comprising:
in response to the computer readable program code configured to determine a selection of the function of the utility interface, computer readable program code configured to format the standard user interface for display with an indication of the standard function that corresponds to the selected function of the utility interface.

16. The computer program product of claim 15, wherein the indication of the standard function that corresponds to the selected function of the utility interface is selected from the group consisting of:
- pointing to the location of the standard function on the standard user interface;
- circling the location of the standard function on the standard user interface; and
- moving a cursor to the location of the standard function on the standard user interface.

17. The computer program product of claim 12, wherein a function of the active service and function of a first predetermined related service correspond to the same functionality when executed but are represented by different symbols on the standard user interface and a user interface associated with the first predetermined related service, and
- wherein the computer readable program code is further configured to format for display on the utility interface the symbol associated with the function of the active service.

* * * * *